(12) United States Patent
Sansum et al.

(10) Patent No.: US 10,473,092 B2
(45) Date of Patent: Nov. 12, 2019

(54) THERMOSTAT WITH THERMALLY RESPONSIVE MATERIAL AND FORCE TRANSMITTING ELEMENT

(71) Applicant: Kohler Mira Limited, Cheltenham, Gloucestershire (GB)

(72) Inventors: Nigel Sansum, Gloucester (GB); Richard Mead, Cheltenham (GB)

(73) Assignee: KOHLER MIRA LIMITED (GB)

( * ) Notice: Subject to any disclaimer, the term of this patent is extended or adjusted under 35 U.S.C. 154(b) by 373 days.

(21) Appl. No.: 15/305,310

(22) PCT Filed: Apr. 17, 2015

(86) PCT No.: PCT/GB2015/051171
§ 371 (c)(1),
(2) Date: Oct. 19, 2016

(87) PCT Pub. No.: WO2015/162412
PCT Pub. Date: Oct. 29, 2015

(65) Prior Publication Data
US 2017/0037835 A1 Feb. 9, 2017

(30) Foreign Application Priority Data
Apr. 22, 2014 (GB) .................................. 1407104.7

(51) Int. Cl.
G05D 23/02 (2006.01)
F03G 7/06 (2006.01)
G01K 5/48 (2006.01)
G05D 23/12 (2006.01)

(52) U.S. Cl.
CPC ................. *F03G 7/06* (2013.01); *G01K 5/48* (2013.01); *G05D 23/021* (2013.01); *G05D 23/022* (2013.01); *G05D 23/02* (2013.01); *G05D 23/12* (2013.01)

(58) Field of Classification Search
CPC .... G05D 23/02; G05D 23/021; G05D 23/022; G05D 23/12; G05D 23/13; G05D 23/1306; G05D 23/132
See application file for complete search history.

(56) References Cited

U.S. PATENT DOCUMENTS 2,593,238 A * 4/1952 Albright .............. G05D 23/021
106/236
3,035,444 A * 5/1962 Pressel ................. G05D 23/021
236/DIG. 5
3,059,475 A 10/1962 Vernet et al.
3,188,867 A 6/1965 Freismuth
3,822,563 A * 7/1974 Orth ...................... F25B 41/043
236/92 B (Continued)

FOREIGN PATENT DOCUMENTS

GB          1101250     1/1968
WO      WO97/49914     12/1997

OTHER PUBLICATIONS

International Search Report regarding PCT/GB2015/051171; 3 pgs.

*Primary Examiner* — Edward F Landrum
*Assistant Examiner* — Daniel C Comings
(74) *Attorney, Agent, or Firm* — Foley & Lardner LLP

(57) ABSTRACT

A thermostat comprises a hollow body containing a thermally responsive material, and a force transmitting member affixed to the body by an over-molded portion.

20 Claims, 17 Drawing Sheets

(56) References Cited

U.S. PATENT DOCUMENTS

| | | | | |
|---|---|---|---|---|
| 5,135,163 A | * | 8/1992 | Cho | G05D 23/022 |
| | | | | 236/100 |
| 5,294,046 A | * | 3/1994 | Fishman | F01P 11/16 |
| | | | | 236/34.5 |
| 2008/0223316 A1 | * | 9/2008 | Banta | F01P 7/16 |
| | | | | 123/41.1 |
| 2013/0112763 A1 | * | 5/2013 | Roman | F16K 31/002 |
| | | | | 236/101 R |
| 2013/0334327 A1 | | 12/2013 | Lamb | |

* cited by examiner

THERMOSTAT WITH THERMALLY RESPONSIVE MATERIAL AND FORCE TRANSMITTING ELEMENT

This application is a U.S. National Stage application of International Patent Application No. PCT/GB2015/051171, filed on Apr. 17, 2015, which claims priority to and the benefit of GB Patent Application No. 1407104.7, filed Apr. 22, 2014. International Patent Application No. PCT/GB2015/051171 and GB Patent Application No. 1407104.7 are incorporated by reference herein in their entireties.

This application concerns improvements in or relating to thermostats and to thermostatic valves employing such thermostats. The invention has application to thermostats and thermostatic valves for a wide range of applications including, but not limited to, thermostats and thermostatic valves for water supply installations. It will be understood however that we do not intend to be limited to such applications and that the invention is capable of wider application to include thermostats and thermostatic valves for fluids generally including, but not limited to, liquids, gases or mixtures thereof for any purpose.

One application of thermostatic valves for water supply installations is to provide a source of temperature controlled fluid for bathing, showering, washing and similar uses. Known thermostatic valves are operable to control mixing of fluids of different temperature, for example hot and cold fluids such as hot and cold water, to provide a required fluid temperature and to maintain the required fluid temperature substantially constant.

A common type of thermostatic valve employs a thermostat to monitor the temperature of the fluid flowing over the thermostat and respond to a change in temperature from the required temperature to alter the relative proportions of hot and cold fluid to return the fluid temperature to the required temperature.

Figure 16:
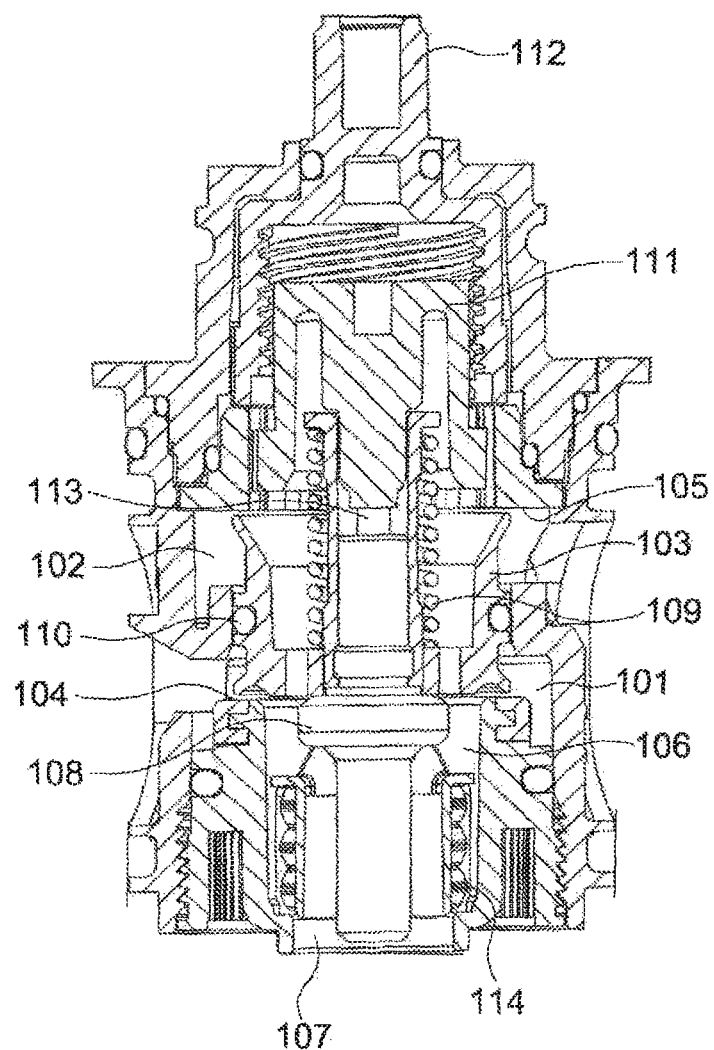

One such arrangement is shown in FIG. 16 having a hot fluid inlet chamber 101, a cold fluid inlet chamber 102 and a valve member 103 movable between a hot seat 104 and a cold seat 105 for controlling flow of hot fluid and cold fluid from the inlet chambers 101, 102 to a mixing chamber 106 communicating with an outlet 107 for temperature controlled fluid. The valve member 103 is mounted on a thermostat 108 under the biasing of an overload spring 109 and carries an O-ring separator seal 110 that provides a seal between the inlet chambers 101, 102. The thermostat 108 is movable to position the valve member 103 to control the flows of hot and cold fluid according to user selection of the outlet fluid temperature by a drive assembly 111 having a spindle 112 for mounting a manually operable control knob or lever. The thermostat 108 contains a thermally responsive material such as wax that expands in response to an increase in fluid temperature and contracts in response to a decrease in fluid temperature flowing over the thermostat 108 in the mixing chamber 106.

Change in volume of the thermally responsive material is transmitted to an actuator rod 113 to alter the length of the actuator rod 113 projecting from the thermostat 108. More especially, the projecting length of the actuator rod 113 increases in response to expansion of the thermally responsive material and the thermostat 108, and with it the valve member 103, move against the biasing of a return spring 114 to reduce the flow of hot fluid and increase the flow of cold fluid. When the valve member 103 seats on the hot seat 104 to shut-off the flow of hot fluid, further movement of the thermostat 108 is permitted by compression of the overload spring 109 to avoid damage to the valve member 103 and/or hot seat 104. Conversely, the projecting length of the actuator rod 113 reduces in response to contraction of the thermally responsive material and the thermostat 108, and with it the valve member 103, move under the biasing of the return spring 114 to increase the flow of hot fluid and reduce the flow of cold fluid.

The assembly of several components, including the thermostat, valve member, return spring, overload spring and separator seal, complicates manufacture and adds to costs.

Figure 17:
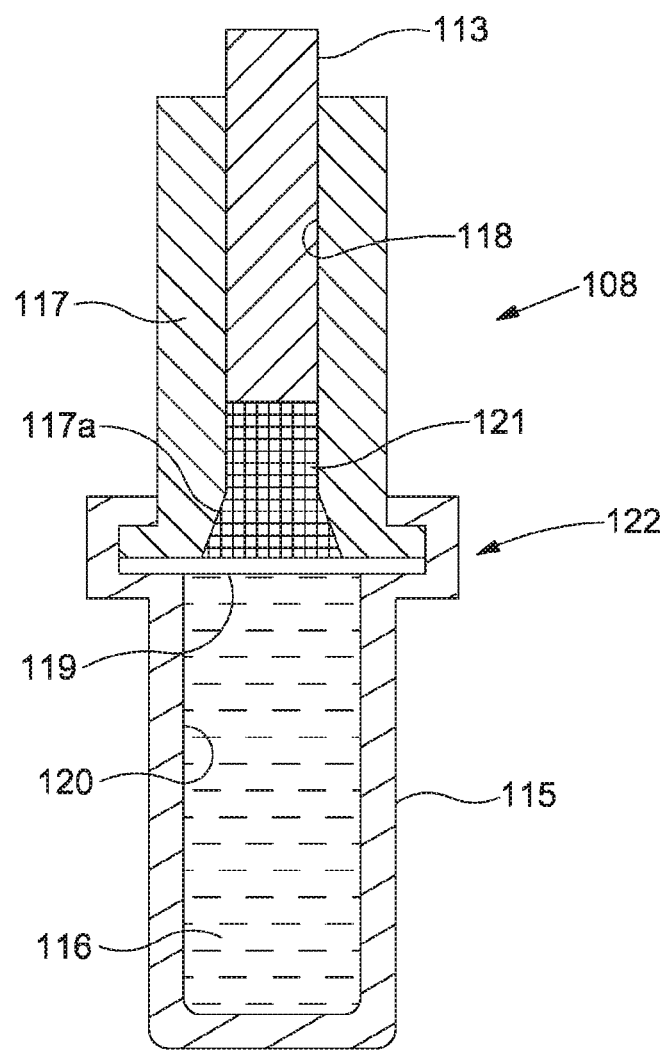

A typical thermostat 108 is shown in FIG. 17 and has a body part 115 containing the thermally responsive material 116 and a guide part 117 with a bore 118 in which the actuator rod 113 is received for sliding movement to change the projecting length of the rod 113. A flexible diaphragm 119 is clamped around a marginal edge portion between the body part 115 and the guide part 117 to form a sealed chamber 120 containing the thermally responsive material 116 within the body part 115. Change in volume of the thermally responsive material 116 is transmitted to the actuator rod 113 by displacing a centre portion of the diaphragm 119. The movement is amplified by a rubber piston plug 121 extending through a reducing diameter 117a in the guide part 117. The actuator rod 113 travels within the bore 118 to alter the protruding length of the actuator rod 113.

Clamping the diaphragm 119 between two parts of the thermostat creates a large collar or flange 122 that can have an adverse impact on flow of fluid over the part of the thermostat containing the wax and thus on the performance of the thermostat. The collar or flange 122 may also reduce the space available within the thermostat to contain the thermally responsive material. The collar or flange 122 also results in a larger size in relation to effective sensing surface area.

A further effect of the extending of the rubber plug 121 is that high forces are required to return the actuator rod 113 to its originating position as the thermally responsive material 116 is cooled.

An additional further effect of the number of components required for assembly of the valve and the construction of the thermostat is that reducing the size of the valve to fit smaller space envelopes may be restricted and thus the size of valves that can be produced.

The present invention has been made from a consideration of the foregoing and seeks to provide improvements to the known thermostats and thermostatic valves employing such thermostats.

A first embodiment relates to a thermostat comprising a hollow body containing a thermally responsive material, and a force transmitting member affixed to the body.

The force transmitting member may be affixed by bonding to an internal surface of the hollow body. An adhesive bonding agent may be employed. The adhesive may be heat activated. For example, the force transmitting member may be formed in situ, for example by over moulding, where the temperature during the moulding process activates the adhesive to affix an over moulded portion of the force transmitting member to the hollow body. Other methods of affixing the force transmitting member that may be employed include use of a chemical bonding agent or providing a mechanical key between the hollow body and the force transmitting member.

It may be that the hollow body has a sidewall extending from a first end to a second end and the force transmitting member is affixed to the sidewall between the first and second ends of the hollow body. It may be that the sidewall of the hollow body is formed in one piece.

Affixing the force transmitting member to the sidewall of the hollow body avoids the problem in existing thermostats of clamping the force transmitting member around the peripheral edge. As a result, the flange produced between two parts of the thermostat body in existing thermostats to clamp the force transmitting member may be avoided. This may provide one or more benefits for manufacture and/or operation of the thermostat. One benefit is that the size and/or shape of the thermostat may be optimised for smooth flow of fluid past the thermostat compared to existing thermostats where the flange prevents smooth flow of fluid past the thermostat. This may improve heat transfer between the fluid and the thermally responsive material contained within the thermostat with the result that response of the thermostat to correct any deviation of the fluid temperature from a desired fluid temperature may be improved. Another benefit is that the thermostat may be more robust and better able to withstand the forces generated by expansion of the thermally response material compared to existing thermostats where diaphragm rupture or separation of the two parts of the thermostat body clamping the force transmitting member can result in the thermostat leaking or bursting.

In addition, by affixing the force transmitting member to the sidewall of the hollow body expansion of the thermally responsive material creates deflection through compressive and tensile stresses in the transmitting member that, as a result of the resilience of the flexible material, the actuator member return stroke is assisted. It may be that the return spring can be omitted or the rating of the return spring can be lower so that the effects of hysteresis on the operation of the thermostat can be reduced or may even be eliminated.

A second embodiment relates to a thermostat comprising a hollow body containing a thermally responsive material, and a force transmitting member configured to control a force applied to the force transmitting member by the thermally responsive material.

Controlling the force applied to the force transmitting member through the interface between the thermally responsive material and the force transmitting member and amplification of the expansion of the thermally responsive material in cooperation with the shape of the hollow body may improve performance of the thermostat and may contribute to a reduction in size of the thermostat.

The thermostat of the second embodiment may include any feature or combination of features of the thermostat described for the first embodiment.

A third embodiment relates to a thermostat comprising a hollow body containing a thermally responsive material, an actuator member, and a force transmitting member affixed to the actuator member by a bonded portion.

Affixing the force transmitting member to the actuator member through a bonded portion may improve performance of the actuator member to changes in the force applied to the force transmitting member by the thermally responsive material. In existing thermostats, a return spring is compressed during the expansion stroke of the thermostat when the volume of the thermally responsive material increases and the force stored in the spring is released during the return stroke of the thermostat when the volume of the thermally responsive material reduces so that the thermostat responds to change in volume of the thermally responsive material. The resulting hysteresis can however have an adverse effect on the operation of the thermostat. By affixing the force transmitting member to the hollow body, expansion of the thermally responsive material creates deflection through compressive and tensile stresses in the transmitting member that, as a result of the resilience of the flexible material, the return stroke is assisted. The actuator member follows the force transmitting member during the return stroke and it may be that the return spring can be omitted or the rating of the return spring can be lower so that the effects of hysteresis on the operation of the thermostat can be reduced or may even be eliminated. The force transmitting member may be affixed to the actuator member by a bonding agent, for example an adhesive bonding agent or chemical bonding agent. Where the force transmitting agent is bonded to the sidewall of the hollow body, the bonding agent may be the same as or different to the bonding agent employed to bond the force transmitting member to the actuator member.

The thermostat of the third embodiment may include any feature or combination of features of the thermostats described for the first and/or second embodiments.

A fourth embodiment relates to a thermostat comprising a hollow body containing a thermally responsive material and an overload device.

Providing the overload device as part of the thermostat avoids the need for a separate overload mechanism such as a spring or equivalent, thereby reducing the number of parts for assembly and may contribute to a reduction in size and complexity compared to a separate thermostat and overload mechanism.

The thermostat of the fourth embodiment may include any feature or combination of features of the thermostats described for the first and/or second and/or third embodiments.

A fifth embodiment relates to a thermostat comprising a hollow body containing a thermally responsive material and/or a return device.

Providing the return device integrated into the thermostat construction avoids a separate return mechanism thereby reducing the number of parts for assembly and may contribute to a reduction in size compared to a separate thermostat and return mechanism.

The thermostat of the fifth embodiment may include any feature or combination of features of the thermostats described for the first and/or second and/or third and/or fourth embodiments.

A sixth embodiment relates to a thermostat comprising a hollow body configured to increase a surface area of the thermostat for heat transfer to a thermally responsive material contained in the body.

Increasing the surface area for heat transfer may improve performance of the thermostat and may contribute to a reduction in size of the thermostat and valve assembly for controlling the mixing of two fluids.

The thermostat of the sixth embodiment may include any feature or combination of features of the thermostats described for the first and/or second and/or third and/or fourth and/or fifth embodiments.

A seventh embodiment relates to a valve for controlling mixing of two fluids, the valve comprising a valve member having a body provided with a return device and an overload device.

Providing the return device and overload device as part of the valve member avoids a separate return spring and separate overload spring thereby reducing the number of parts for assembly and may contribute to a reduction in size.

The seventh embodiment may include a thermostat having any feature or combination of features of the thermostats described for the first and/or second and/or third and/or fourth and/or fifth and/or sixth embodiments.

An eighth embodiment relates to a valve for controlling mixing of two fluids, the valve comprising a valve member having a body that provides a separator seal.

Providing the separator seal as part of the body avoids a separate seal thereby reducing the number of parts for assembly and consequently the number of performance influencing geometric tolerances.

The eighth embodiment may include a thermostat having any feature or combination of features of the thermostats described for the first and/or second and/or third and/or fourth and/or fifth and/or sixth embodiments.

The eighth embodiment may include any feature or combination of features of the valve described for the seventh embodiment.

A ninth embodiment relates to a combined valve and thermostat, the thermostat comprising a hollow body containing a thermally responsive material and a force transmitting member, the valve having a valve member arranged on an external surface of the hollow body and integral with the force transmitting member.

The valve member may include one or more of a return device, an overload device and a separator seal as described for the seventh and eight embodiments. The thermostat may include any feature or combination of features of the thermostats described for the first, second, third, fourth, fifth and sixth embodiments. The valve may include any feature or combination of features of the valves described for the seventh and eighth embodiments.

A tenth embodiment relates to a thermostatic mixer for mixing two fluids, the mixer having a thermostat according to any one or more of the first, second, third, fourth, fifth and sixth embodiments.

An eleventh embodiment relates to a thermostatic mixer for mixing two fluids, the mixer having a valve according to the seventh and/or eighth embodiments.

A twelfth embodiment relates to a thermostatic mixer for mixing two fluids, the mixer having a combined valve and thermostat according to the ninth embodiment.

The foregoing is a summary and thus, by necessity, contains simplifications, generalizations, and omissions of detail. Consequently, those skilled in the art will appreciate that the summary is illustrative only and is not intended to be in any way limiting. Other aspects, inventive features, and advantages of the devices and/or processes described herein will become apparent in the detailed description set forth herein and taken in conjunction with the accompanying drawings.

Figure 1:
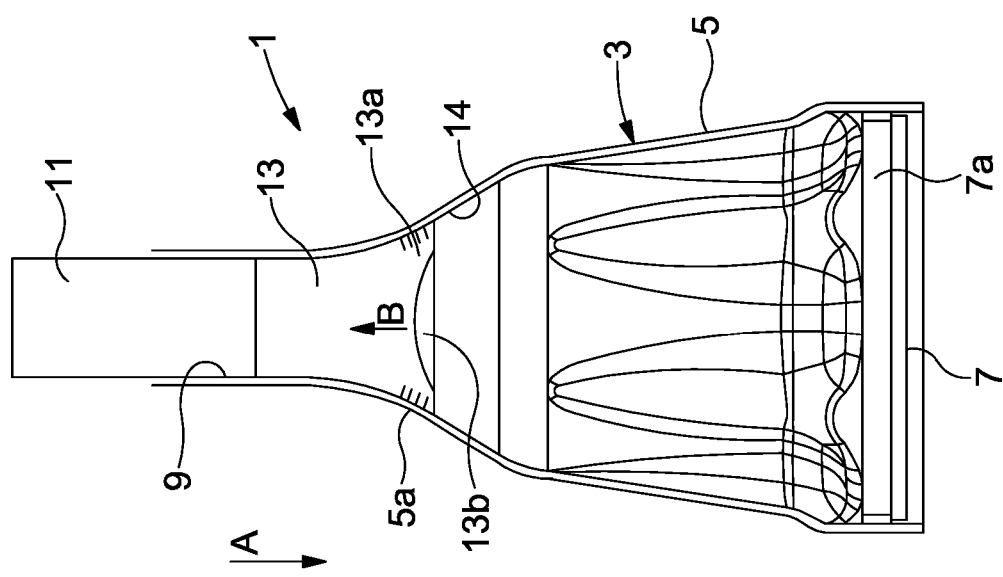
Figure 2:
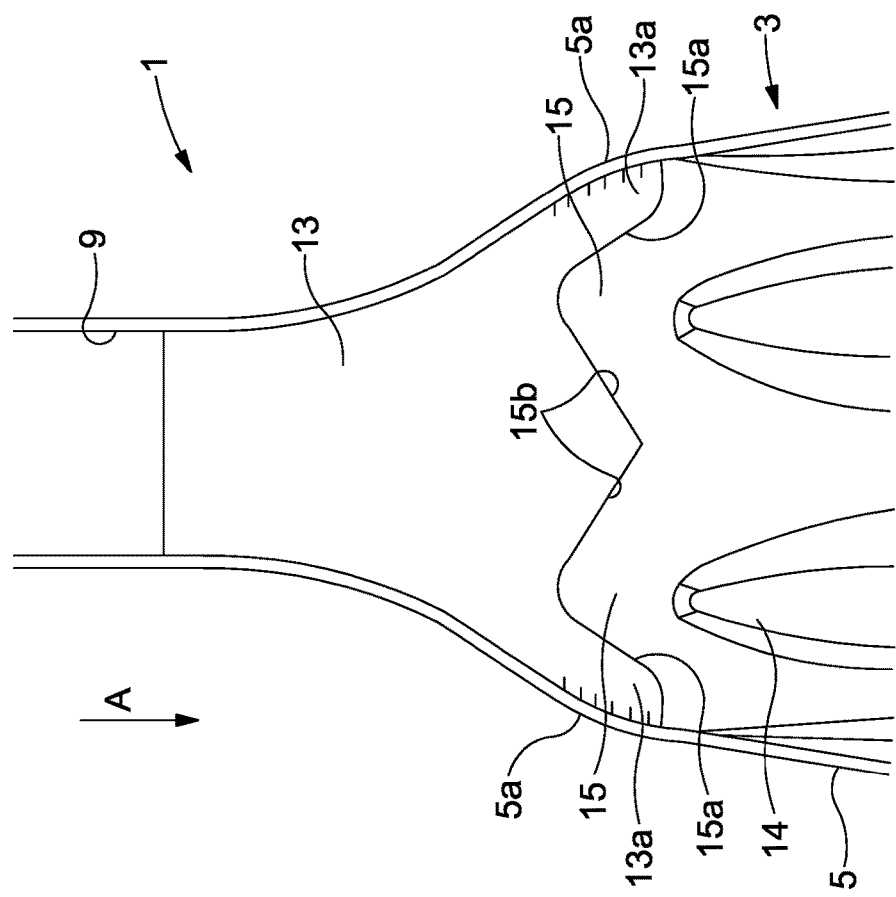
Figure 3:
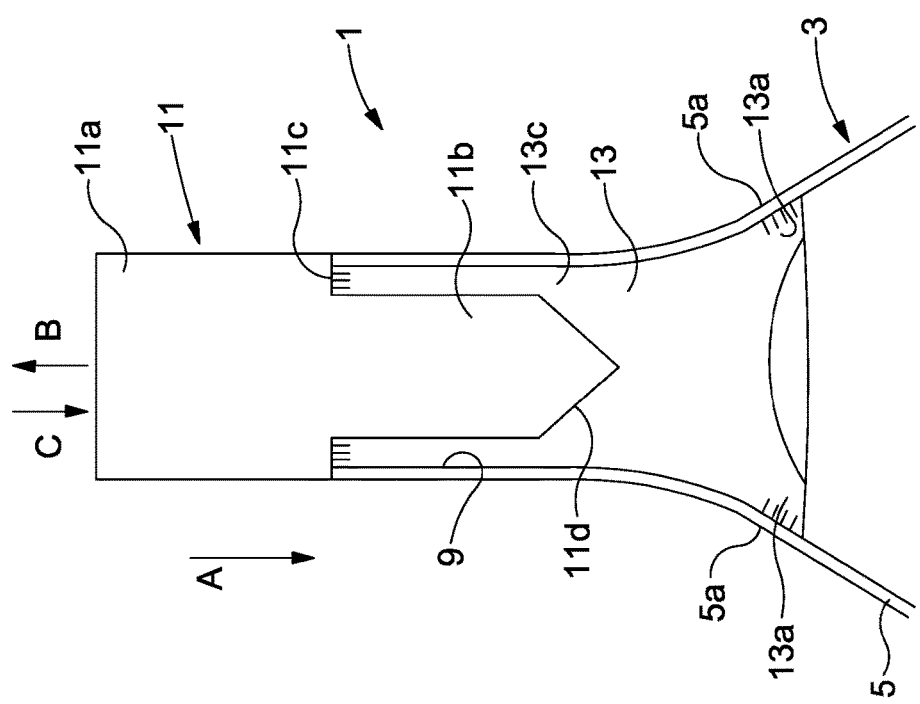
Figure 4:
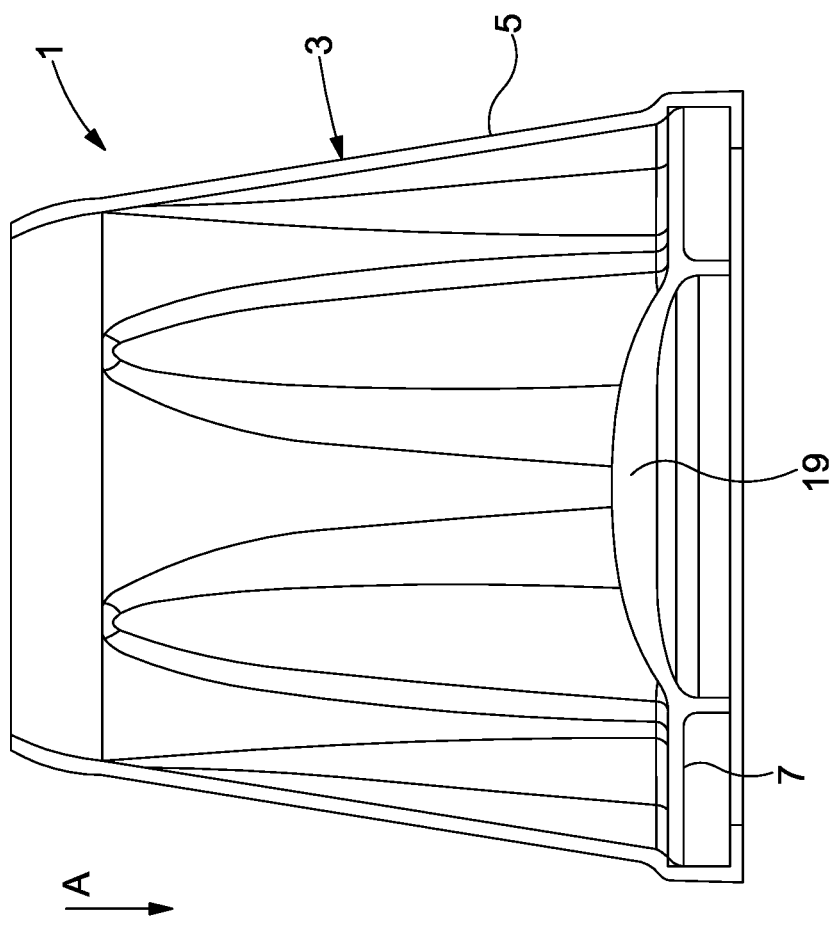
Figure 5:
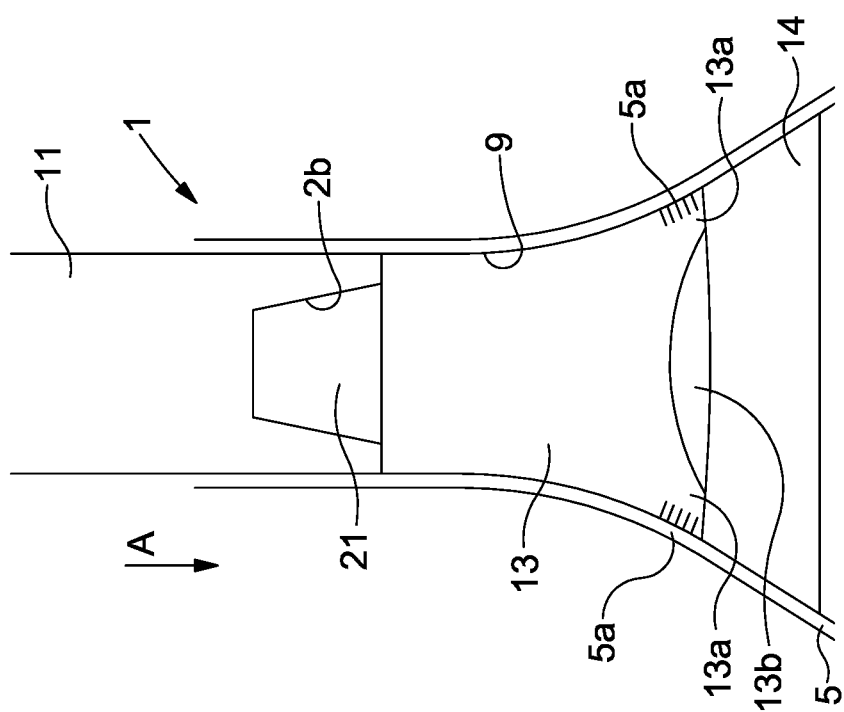
Figure 6:
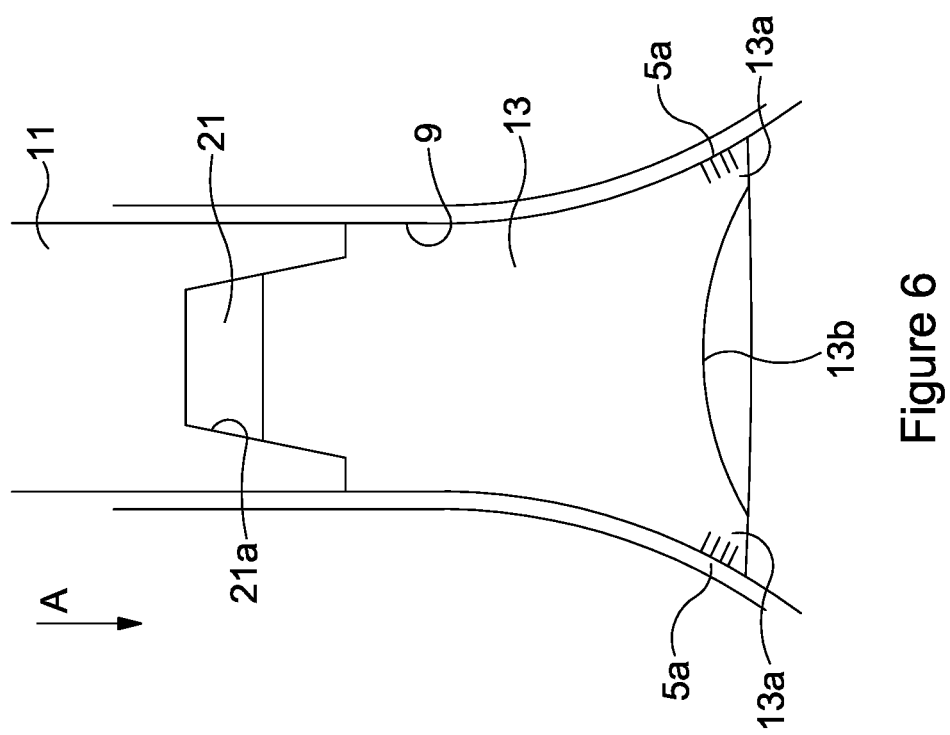
Figure 7:
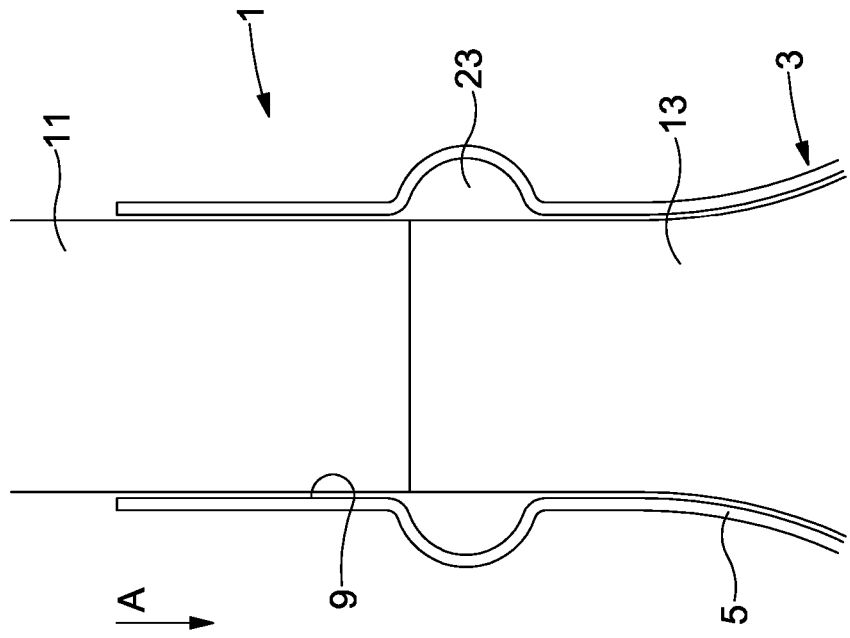
Figure 7B:
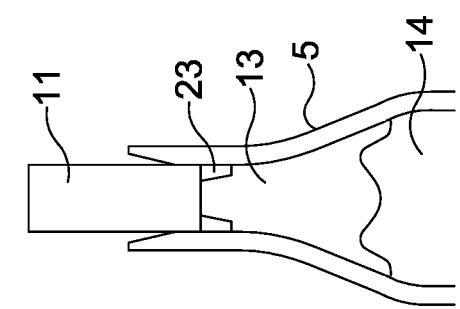
Figure 7A:
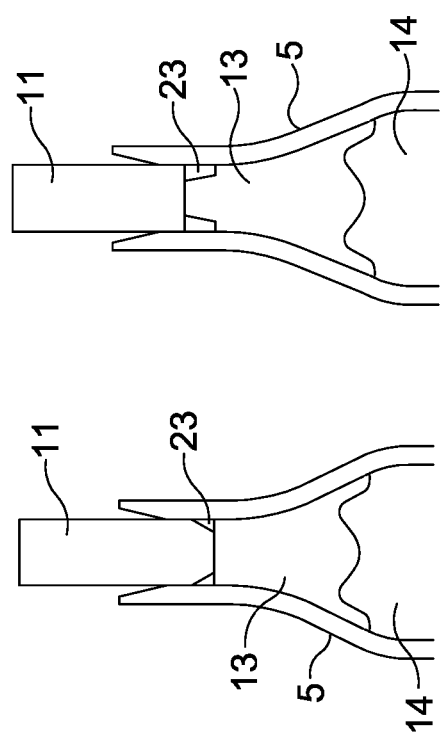
Figure 8:
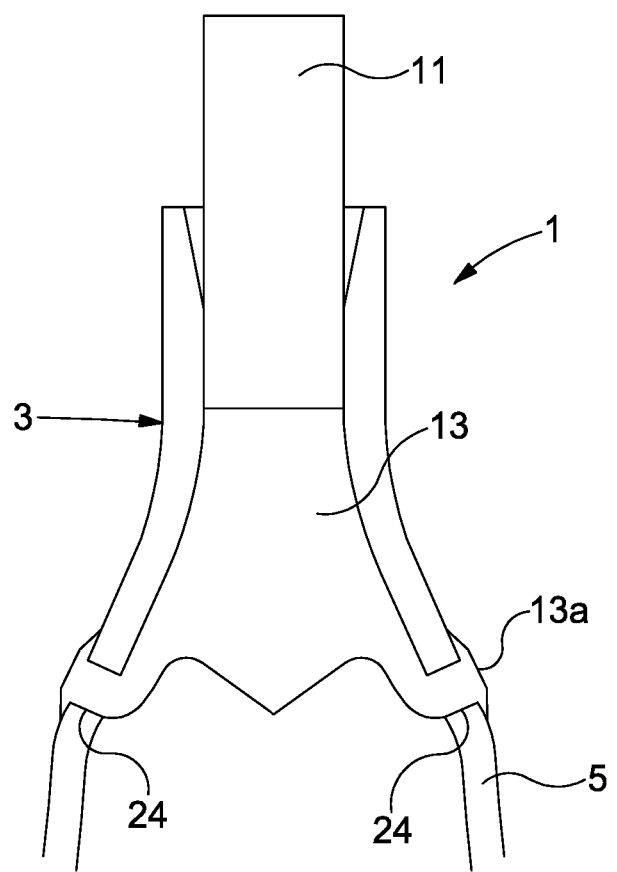
Figure 9:
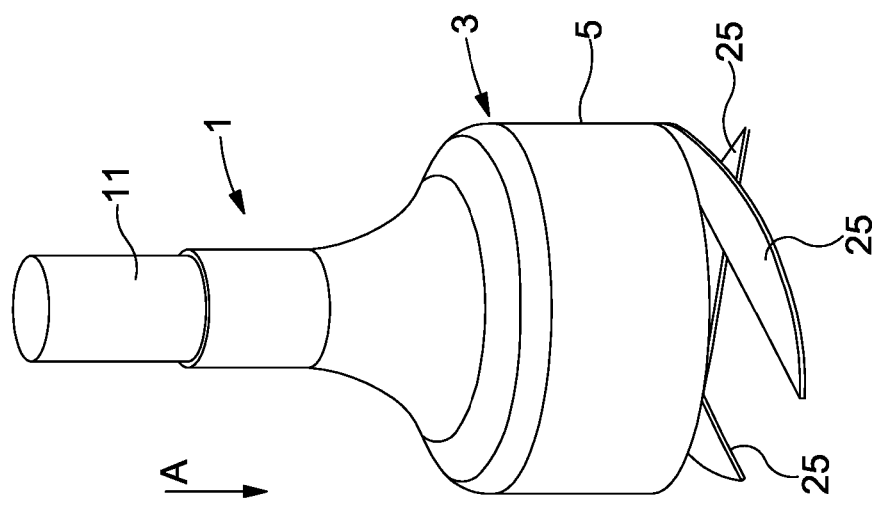
Figure 10:
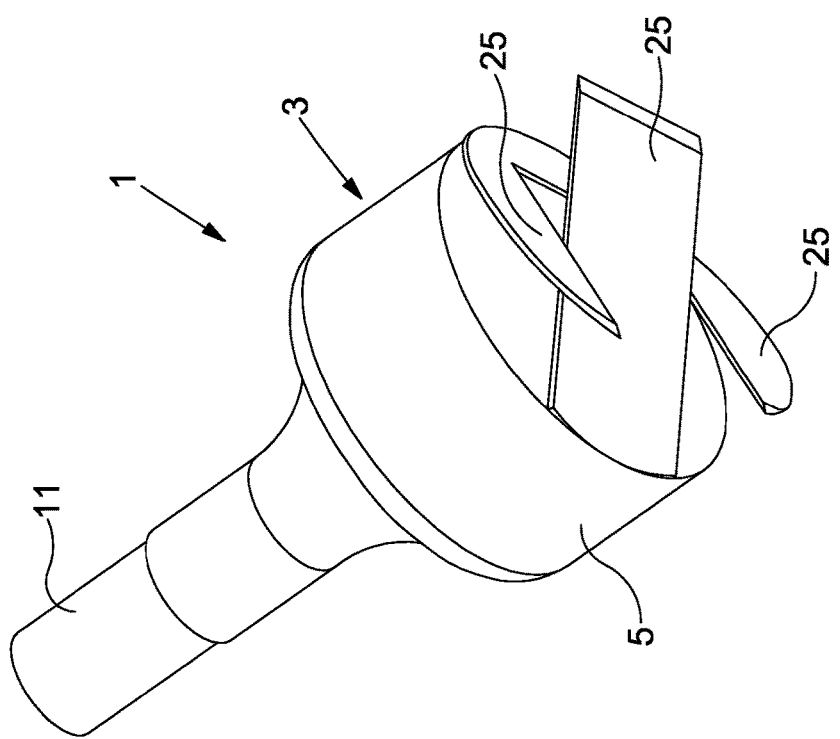
Figure 11:
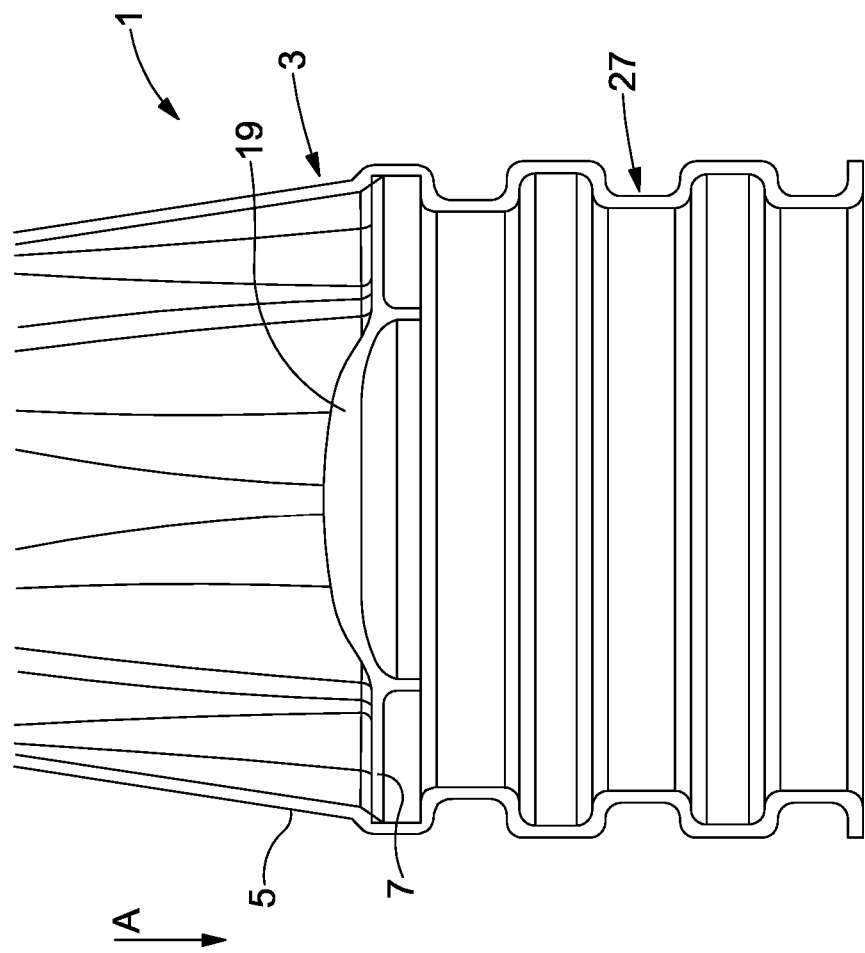
Figure 12:
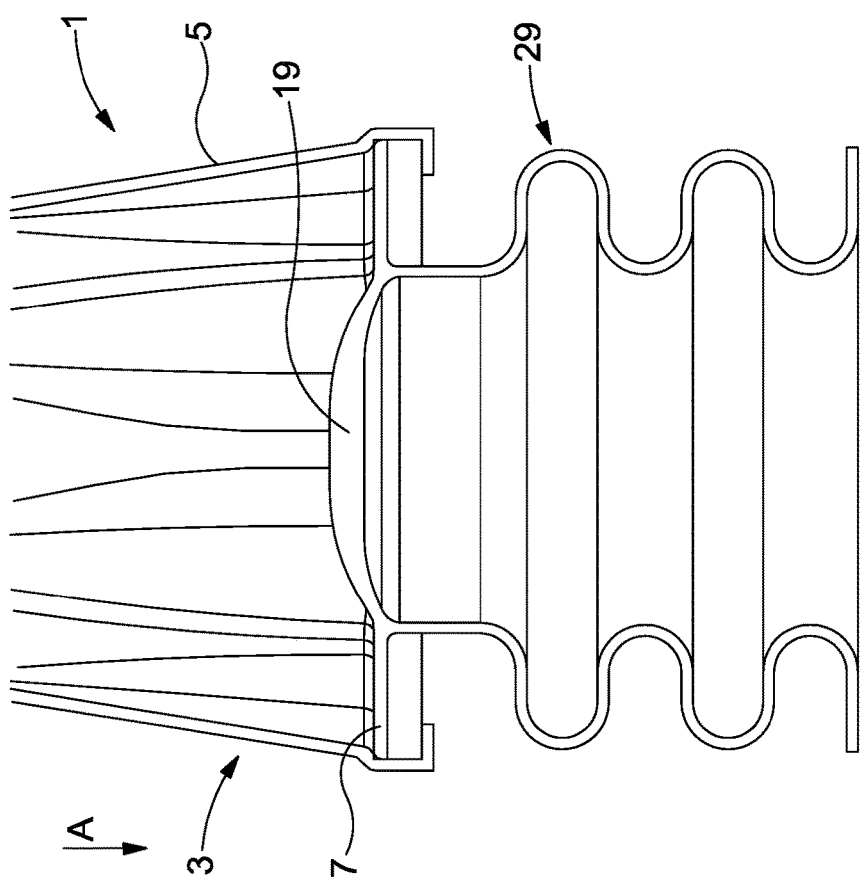
Figure 13:
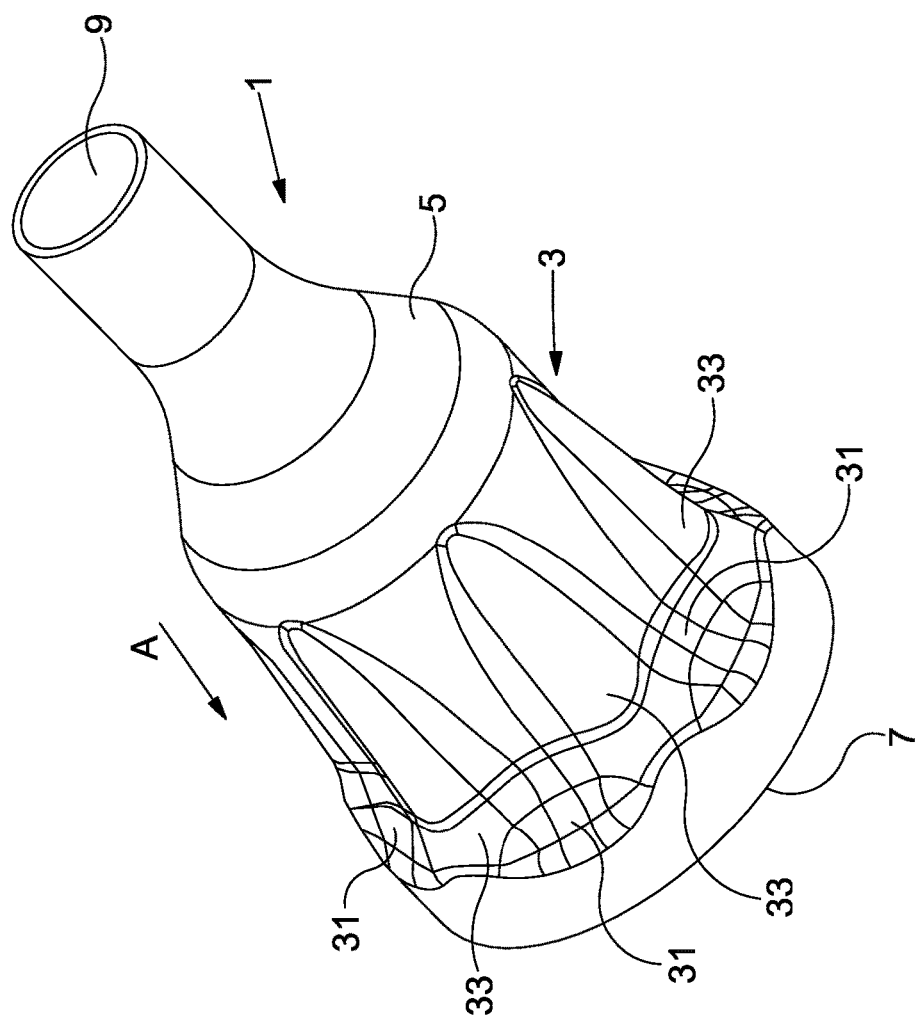
Figure 14:
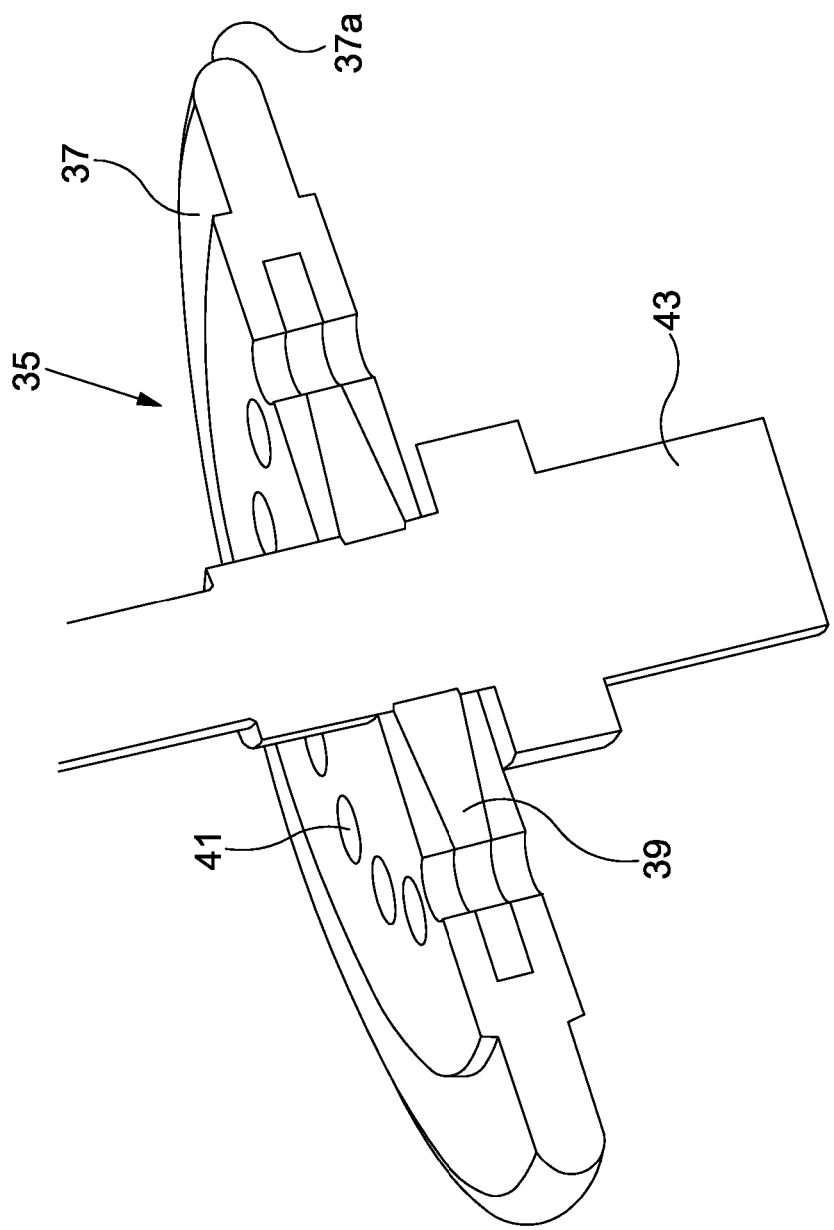
Figure 15:
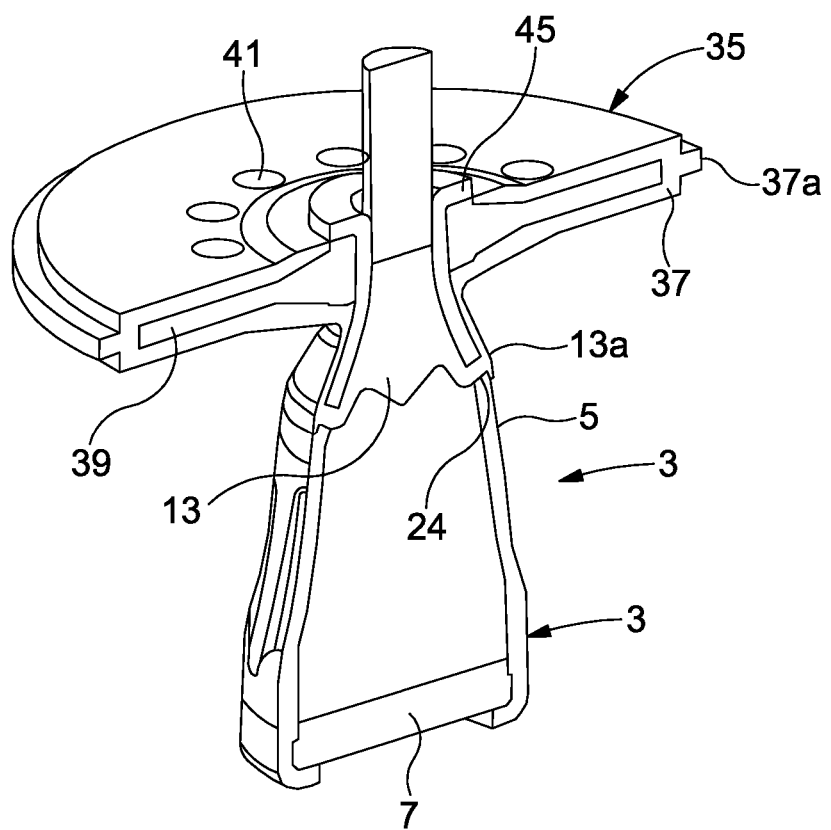

Embodiments will now be described by way of example only with reference to the accompanying drawings in which:

FIG. 1 shows a thermostat embodiment;
FIG. 2 shows another thermostat embodiment;
FIG. 3 shows another thermostat embodiment;
FIG. 4 shows another thermostat embodiment;
FIG. 5 shows another thermostat embodiment;
FIG. 6 shows the thermostat of FIG. 5 in an overload condition;
FIG. 7 shows another thermostat embodiment;
FIGS. 7a, 7b show alternative arrangements of the thermostat embodiment of to FIG. 7;
FIG. 8 shows another thermostat embodiment;
FIG. 9 shows another thermostat embodiment;
FIG. 10 shows another view of the thermostat of FIG. 9;
FIG. 11 shows another thermostat embodiment;
FIG. 12 shows another thermostat embodiment;
FIG. 13 shows another thermostat embodiment;
FIG. 14 shows a valve member embodiment;
FIG. 15 shows another valve member embodiment;
FIG. 16 shows a prior art thermostatic mixer; and
FIG. 17 shows a prior art thermostat.

Referring to FIGS. 1 to 13 of the accompanying drawings, various thermostat embodiments are shown. For convenience the same reference numerals are used to indicate the same or similar parts/features throughout and the description of any part/feature in any embodiment applies to the same part/feature in any other embodiment unless the contrary is indicated. As a result, the description of the same or similar parts/features may not be repeated for each embodiment unless required by the context for an understanding of the embodiment.

FIG. 1 shows a thermostat 1. The thermostat 1 may be employed to control fluid temperature in a thermostatic mixer of the type employed in ablutionary installations for bathing, showering, washing and the like to provide a source of temperature controlled fluid, for example water. Such thermostatic mixer may be of the type shown in FIG. 16 although it will be understood the thermostat 1 has application to other types and constructions of thermostatic mixers for mixing two fluids to provide temperature controlled fluid for any purpose. For convenience in the following description of exemplary embodiments, the thermostat 1 is described in applications for mixing two fluids of different temperature, for example hot and cold water, to provide temperature controlled fluid, for example water. It will be understood that this is not intended to be limiting on the application and use of the thermostat and that the thermostat may be employed in applications for controlling temperature of any fluid and any other application where response of the thermostat to fluid temperature is employed for any purpose.

The thermostat 1 has a body 3 containing a volume of thermally responsive material (not shown) such as a wax. The body 3 may be made of metal or alloy or any other thermally conductive material/materials. The body 3 may have a high thermal conductivity for heat transfer between water flowing over the body 3 and the thermally responsive material. The thermally responsive material may include one or more additives to improve thermal conductivity of the material and thus response to temperature change. Such additives may include metallic particles. Other thermally responsive materials will be familiar to those skilled in the art.

The body 3 has a sidewall 5 extending from a first end to a second end and defining an axially extending cavity. The cavity is closed at the first end by a base wall 7. The base wall 7 may be affixed to the sidewall 5 to form a unitary body. The base wall 7 may be bonded to the sidewall 5, for example by brazing, welding or other suitable technique. Alternatively the base wall 7 may be affixed to the sidewall 5 mechanically, for example by crimping, and a seal may be provided between mating faces of the base wall 7 and sidewall 5. For example, one of the base wall 7 and sidewall 5 may be provided with an overmoulded section of rubber or other suitable elastomer 7a that forms a seal when the base wall 7 is affixed to the sidewall 5. The sidewall 5 converges towards the second end into a bore 9. The bore 9 may be of any cross-sectional shape, for example circular.

An actuator member 11 such as a rod or piston is slidably mounted in the bore 9. The actuator member 11 is separated from the thermally responsive material by a force transmitting member 13. The inner end of the actuator member 11 engages the force transmitting member 13 within the bore 9. It may be that a separate element such as a washer (not shown) is located between the actuator member 11 and the force transmitting member 13.

The force transmitting member 13 may be made of rubber, for example a synthetic rubber such as ethylene propylene diene monomer (EPDM), or other suitable elastomer. The force transmitting member 13 is affixed to the sidewall 5 to define with the body 3 a sealed chamber 14 containing the thermally responsive material. The force transmitting member 13 may be affixed to the sidewall 5 by over-moulding. The force transmitting member 13 may be a plug or bung affixed at one end region 13a to the convergent region 5a of the sidewall 5 and extending into the bore 9. The convergent region 5a may be coated with a bonding agent such as adhesive compatible with the material of the force transmitting member 13. The bonding agent may be heat activated to affix the force transmitting member 13 during the moulding operation. A chemical bonding agent may be used in place of the adhesive bonding agent. Other suitable methods of affixing the force transmitting member 13 may be employed such as described herein.

In use, the thermostat 1 is positioned to monitor the temperature of fluid flowing over the body 3 in the direction of arrow A. For example in the case of a thermostatic mixer for hot and cold water, the thermostat 1 may be arranged in a mixing chamber where flows of hot and cold water can be mixed to provide temperature controlled water for bathing, showering, washing and the like as shown in FIG. 16. The flows of hot and cold water may be controlled according to user selection of a desired outlet water temperature and the thermostat 1 preferably responds to deviation in the outlet water temperature from the selected temperature to adjust the flows to alter the relative preparations of hot and cold water admitted to the mixing chamber to return the outlet water temperature to the selected temperature. For example, the hot and cold flows may be controlled by a valve having a valve member movable between hot and cold seats as shown in FIG. 16.

More especially, the thermally responsive material expands in response to an increase in temperature of the outlet water causing an increase in volume of the thermally responsive material confined in the chamber within the body 3. This expansion acts on the lower end of the force transmitting member 13 which is affixed to the sidewall 5 of the body 3 around the perimeter. As a result a centre region 13b of the force transmitting member 13 deforms as indicated by the arrow B causing the portion of the force transmitting member 13 in the bore 9 to push on the inner end of the actuator member 11. As a result the actuator member 11 is displaced to increase the length of the actuator member 11 projecting from the bore 9. This in turn moves the body 3 of the thermostat 1 against the biasing of a return spring and with it the valve to change the proportions of hot and cold water admitted to the mixing chamber to return the outlet water temperature to the selected temperature.

Conversely, the thermally responsive material contracts in response to a reduction in temperature of the outlet water causing a reduction in volume of the thermally responsive material confined in the chamber within the body 3. As a result, the pressure of the thermally responsive material acting on the centre region 13b of the force transmitting member 13 is reduced allowing the actuator member 11 to move further into the bore 9 reducing the length of the actuator member 11 projecting from the bore 9 under the biasing of the return spring acting on the body 3 of the thermostat. Again this moves the body 3 of the thermostat and with it the valve to change the proportions of hot and cold water admitted to the mixing chamber to return the outlet water temperature to the selected temperature.

As will be understood, affixing the force transmitting member 13 to the sidewall 5, for example by over-moulding, simplifies the construction of the thermostat compared to prior art arrangements such as shown in FIG. 15 where the diaphragm is clamped between two parts of the body. Moreover, displacement of the force transmitting member 13 due to change in volume of the thermally responsive material sets up compression and tension in the material of the force transmitting member 13 creating a reactive return force that may contribute to an improved performance of the thermostat to temperature change. Additionally, displacement of the force transmitting member 13 may be assisted by the convergent sidewall 5 leading to the bore 9. Avoiding the collar employed to clamp the two parts of the prior art thermostat shown in FIG. 17 enhances smooth flow of water over the surface of the thermostat and may improve heat transfer between the water and the thermally responsive material. It may also enable the volume of thermally responsive material to be increased without increasing the overall size of the thermostat. It may also improve the burst strength of the thermostat.

The lower end of the force transmitting member 13 may be provided with a coating that prevents absorption of the thermally responsive material by the material of the force transmitting member 13. The coating may be chosen to be inert to the thermally responsive material and/or the material of the force transmitting member 13.

The force transmitting member 13 may be configured to reduce friction with contact surfaces. For example, the material of the force transmitting member 13 may include one or more additives to reduce friction with contact surfaces.

FIG. 2 shows another thermostat 1. In this embodiment, the lower end of the force transmitting member 13 is configured to provide one or more recessed areas 15 in which the thermally responsive material is received. These recessed areas 15 may be configured to control the compression and tension created in the material of the force transmitting member 13 due to change in volume of the thermally responsive material. As shown, the recessed areas 15 may reduce the thickness of the material of the force transmitting member 13 where it is affixed, for example by over-moulding, to the sidewall 5 of the body 3. This may assist displacement of the force transmitting member 13 in response to change in volume of the thermally responsive material. The recessed areas 15 may have portions 15a, 15b that are angled or inclined relative to a centre longitudinal axis of the body 3. The inclination may be the same or different. The inclination may provide or assist in controlling the direction of the forces applied to the material of the force transmitting member 13 by change in volume of the thermally responsive material which may in turn improve performance of the thermostat 1.

FIG. 3 shows another thermostat 1. In this embodiment, an outer end portion 11a of the actuator member 11 is the same diameter as the upper end of the body 3 and is connected to an inner end portion 11b of reduced diameter by a transverse shoulder 11c. The free end of the inner end portion 11b of the actuator member 11 may be tapered 11d. The inner end portion 11b is a clearance fit in the bore 9 and the upper end of the force transmitting member 13 has a matching profile 13c to receive the inner end portion 11b of the actuator member 11. The force transmitting member 13 is affixed to the shoulder 11c of the actuator member 11. For example the force transmitting member 13 may be over-moulded to the shoulder 11c of the actuator member 11. Any other method of affixing the force transmitting member 13 may be employed, for example bonding. The shoulder 11c of the actuator member 11 may be coated with a bonding agent such as adhesive compatible with the material of the force transmitting member 13. The bonding agent may be heat activated to affix the force transmitting member 13 to the actuator member 11 during the moulding operation. Configuring the outer end portion 11*a* of the actuator member 11 to match the diameter of the upper end of the body 3 enables shut-off for the over mould tool to be achieved. It may also assist smooth flow of water past the thermostat. The inner end portion 11*b* of the actuator member 11 is not bonded to the force transmitting member 13 and displacement of the force transmitting member 13 in response to an increase in volume of the thermally responsive material generates forces that are amplified by the shape of the inner end portion 11*b* to move the actuator member 11 in the direction of the arrow B during the expansion stroke of the thermostat. The actuator member 11 is bonded to the force transmitting member 13 at the shoulder 11*c* and displacement of the force transmitting member 13 in response to a reduction in volume of the thermally responsive material generates forces to move the actuator member 11 in the direction of arrow C during the return stroke of the thermostat. This may improve performance of the thermostat 1 compared to existing thermostats. It may be that movement of the actuator member 11 can be controlled by affixing the force transmitting member 13 to the actuator member 11 such the return spring can be omitted or a lower rating return spring can be employed leading to improved thermostat/valve performance. The thermostats shown in FIGS. 1 and 2 may have the force transmitting member 13 affixed to the actuator member 11.

FIG. 4 shows another thermostat 1. In this embodiment, the body 3 is configured to deform resiliently in response to a pre-determined pressure of the thermally responsive material. For example, the base wall 7 may be provided with a central portion 19 that is inwardly domed up to the pre-determined pressure whereupon the central portion 19 reverses and is outwardly domed. The central portion 19 reverts back to be inwardly domed when the pressure drops below the pre-determined pressure. The change in configuration from inwardly domed to outwardly domed increases the volume of the chamber containing the thermally responsive material. When the thermostat 1 is used in a thermostatic mixer for hot and cold water the increase in volume may be employed under overload conditions to allow the thermally responsive material to continue to expand without transmitting the change in volume to the actuator member 11. As a result, when the valve member is seated against the hot seat to shut-off the flow of hot water, further expansion of the thermally responsive material is not transmitted to the valve member and damage to the valve member and/or hot seat may be avoided. The domed central portion 19 performs the function of the separate overload spring 109 provided in prior art thermostatic mixer valves such as shown in FIG. 16. Any other configuration of the base wall 7 that provides a change in volume of the chamber containing the thermally responsive material under overload conditions may be employed.

FIGS. 5 and 6 show another thermostat 1. In this embodiment, overload conditions are accommodated by providing a recess 21 in the inner end of the actuator member 11. Under normal operating conditions (FIG. 5), the forces generated by change in volume of the thermally responsive material are not sufficient to cause the material of the force transmitting member 13 to deform into the recess 21. Under overload conditions (FIG. 6), the material of the force transmitting member 13 is forced into the recess 21 to allow the thermally responsive material to continue to expand without transmitting change in volume to the actuator member 11. As a result, when the valve member is seated against the hot seat to shut-off the flow of hot water, further expansion of the thermally responsive material is not transmitted to the valve member and damage to the valve member and/or hot seat may be avoided. The recess 21 may be designed to reduce in cross-section toward the inner end 21*a*. Such section reduction may assist in forcing the material of the force transmitting member 13 out of the recess 21 when the overload conditions are no longer present allowing the thermostat to return to the normal operating condition.

FIG. 7 shows another thermostat 1. In this embodiment, overload conditions are accommodated by providing a recess 23 in the wall of the bore 9. This arrangement operates in similar manner to the embodiment shown in FIGS. 5 and 6 except that the material of the force transmitting member 13 is forced into the recess 23 in the bore 9 rather than a recess in the inner end of the actuator member 11. An equivalent recess may be created using the end shapes of the force transmitting member 13 and/or the actuator member 11 as shown, for example, by the alternative arrangements in FIGS. 7*a*,7*b*.

As will be understood configuring the thermostat to accommodate overload conditions as exemplified by the embodiments of FIGS. 4 to 7 avoids the need for a separate overload spring such as provided in prior art thermostatic mixers of the type shown in FIG. 16. Providing the thermostat with a built-in or integral overload device reduces the number of separate components which may simplify assembly of thermostatic mixers. It may also allow the thermostat to be reduced in size. Other configurations of overload device may be employed.

FIG. 8 shows another thermostat 1. In this embodiment, the force transmitting member 13 is affixed to the sidewall 5 of the body 3 by a mechanical key. It may be that at least one hole and preferably a plurality of holes 24 is formed in the sidewall 5 of the body 3. Where a plurality of holes 24 is employed, the holes 24 are spaced apart around the sidewall 5, preferably uniformly. The material of the force transmitting member 13 extends through the holes 24 and is configured to affix mechanically the force transmitting member to the sidewall 5. It may be that material forms an annular ring 13*a* extending circumferentially around the outer surface of the body 3 at the lower end of the force transmitting member 13. It will be understood that a mechanical key to affix the force transmitting member 13 to the body 3 may be provided in other ways.

FIGS. 9 and 10 show another thermostat 1. In this embodiment, the body 3 is configured to bias the thermostat 1 to maintain engagement between the actuator member 11 and the drive assembly. For example the body 3 may be provided with one or more flexible formations 25 that act to bias the thermostat 1. The formations 25 may be formed as part of the body 3. The formations 25 may comprise one or more spring legs formed from the base wall 7 by stamping and folded to extend at an angle to the longitudinal axis of the body 3. The formations 25 may be configured so that the biasing force applied to the body 3 in the axial direction by the formations 25 is balanced so as maintain the axial alignment of the thermostat with the other components of the valve under the biasing force. The spring legs perform the function of the separate return spring provided in prior art thermostatic mixer valves such as shown in FIG. 16. Any other configuration of one or more formations 25 for biasing the thermostat may be employed.

FIG. 11 shows another thermostat 1. In this embodiment, biasing of the thermostat 1 to maintain engagement between the actuator member 11 and the drive assembly is provided by one or more flexible formations 27 formed as part of the sidewall 5. The formations 27 may comprise a bellows spring having one or more convolutions. The thermostat 1 may include an overload device to accommodate overload conditions such as a domed central portion 19 of the base wall 7 as shown in FIG. 4. The base wall 7 incorporating the domed central portion 19 may be located and secured within the body 3 by crimping the sidewall 5 of the body 3 to locate and retain the peripheral edge of the base wall 7. A seal member (not shown) may be employed to seal the chamber containing the thermally responsive material. The seal member may be a separate component or one of the base wall 7 and side wall 5 may be provided with an over moulded section that seals the chamber when the base wall 7 is affixed to the side wall 5.

FIG. 12 shows another thermostat 1. In this embodiment, biasing of the thermostat 1 to maintain engagement between the actuator member 11 and the drive assembly is provided by one or more flexible formations 29 formed as part of the base wall 7. The formations 29 may comprise a bellows spring having one or more convolutions. The thermostat 1 may include an overload device to accommodate overload conditions such as a domed central portion 19 of the base wall 7 as shown in FIG. 4. The base wall 7 incorporating the domed central portion 19 and bellows spring may be located and secured within the body 3 by crimping the sidewall 5 of the body 3 to locate and retain the peripheral edge of the base wall 7. A seal member may be employed to seal the chamber containing the thermally responsive material. The base wall 7 with combined domed central portion and bellows spring may be made of beryllium copper strip although other resilient materials may be used.

As will be understood configuring the thermostat 1 to maintain engagement between the actuator member 11 and the drive assembly avoids the need for a separate return spring such as provided in prior art thermostatic mixers of the type shown in FIG. 16. Providing the thermostat with a built-in or integral return device reduces the number of separate components which may simplify assembly of thermostatic mixers. It may also allow the thermostat to be reduced in size.

FIG. 13 shows another thermostat 1. In this thermostat 1, the sidewalls 5 are configured to increase the surface area in contact with the thermally responsive material and the water flowing over the outer surface of the body 3. The sidewalls 5 may be fluted. The flutes 31 may extend in the axial direction and may provide channels 33 in the outer surface of the body 3 along which the water can flow. The increased surface area may improve heat transfer between the water and the thermally responsive material which may in turn lead to improved performance of the thermostat. The channels 33 may assist in achieving a smooth flow of water past the thermostat and may optimise heat transfer between the water and the thermally responsive material.

Features of any of the thermostat embodiments of FIGS. 1 to 13 may be combined with features of any of the other embodiments and the invention extends to and includes all possible combinations and thermostat constructions.

FIG. 14 shows a valve for controlling flows of two fluids, for example hot and cold water. The valve comprises a valve member 35 having an annular body 37 with an internal annular spring disc 39 and one or more through holes 41 for flow of water from one side of the body to the other side. The disc 39 provides the function of the return and overload springs of the mixer valve of FIG. 16. The valve member 35 may replace the valve member of the mixer valve shown in FIG. 16 and the outer peripheral edge 37a of the body 37 may provide the function of the O-ring separator seal between the inlet chambers in the mixer valve of FIG. 16. The valve member 35 may be mounted on a thermostat 43 operable to adjust the position of the valve member 35 between the hot and cold seats to control mixing of the hot and cold water streams. The thermostat may be of conventional type such as shown in FIG. 17. Alternatively, any of the thermostat embodiments shown in FIGS. 1 to 13 may be employed. The disc 39 acts as a return spring to maintain engagement between the thermostat and the drive assembly. The disc 39 also acts as an overload spring by allowing the body to deflect to accommodate continued expansion of the thermally responsive material when the body 35 is seated against the hot heat.

FIG. 15 shows another valve for controlling flow of two fluids which combines features of the valve shown in FIG. 14 with features of one or more of the thermostats 1 shown in FIGS. 1 to 13. The force transmitting member 13 is affixed to the body 3 of the thermostat 1 by a mechanical key as shown in FIG. 8 and the body 37 of the valve member 35 shown in FIG. 14 is formed integrally with the force transmitting member 13 via 13a. Other methods of affixing the force transmitting member 13 may be employed as described herein, for example bonding. As shown the valve member 35 is axially offset from the holes 24 in the sidewall 5 of the body 3 and is located by a flange 45 at the upper end of the body 3. Other configurations of the force transmitting member 13 and integral valve member 35 are possible.

The construction and arrangement of the elements of the thermostat, the valve member and the components thereof shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. The elements and assemblies may be constructed from any of a wide variety of materials that provide sufficient strength or durability, in any of a wide variety of colors, textures, and combinations. Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

For purposes of this disclosure, references in this description to the orientation of any part or feature of any of the embodiments is merely used to identify the various elements as they are oriented in the Figures. These terms are not meant to limit the element which they describe, as the various elements may be oriented differently in various applications. Further, the term "affixed" means the joining of two members directly or indirectly to one another. Such joining may be stationary in nature or moveable in nature and/or such joining may allow for the flow of fluids. Such joining may be achieved with the two members or the two members and any additional intermediate members being integrally formed as a single unitary body with one another or with the two members or the two members and any additional intermediate members may be separate. Such joining may be permanent in nature or alternatively may be removable or releasable in nature.

The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

Although the invention has been described in the exemplary embodiments with reference to thermostatic mixers for ablutionary installations, it will be understood that the principles and concepts described herein are capable of wider application and includes use of thermostats and thermostatic valves where the fluid may be a liquid or gas or a mixture thereof. For example, the invention extends to and includes use of thermostats and thermostatic valves in applications where response of the thermostat to fluid temperature is employed for any purpose.

In a first aspect the invention provides a thermostat comprising a hollow body containing a thermally responsive material, and a force transmitting member affixed to the body.

In a second aspect the invention provides a thermostat comprising a hollow body containing a thermally responsive material, and a force transmitting member configured to control a force applied to the force transmitting member by the thermally responsive material.

In a third aspect the invention provides to a thermostat comprising a hollow body containing a thermally responsive material, an actuator member, and a force transmitting member affixed to the actuator member by a bonded portion.

In a fourth aspect the invention provides a thermostat comprising a hollow body containing a thermally responsive material and an overload device.

In a fifth aspect the invention provides a thermostat comprising a hollow body containing a thermally responsive material and/or a return device.

In a sixth aspect the invention provides a thermostat comprising a hollow body configured to increase a surface area of the thermostat for heat transfer to a thermally responsive material contained in the body.

In a seventh aspect the invention provides a valve for controlling mixing of two fluids, the valve comprising a valve member having a body provided with a return device and an overload device.

In an eighth aspect the invention provides a valve for controlling mixing of two fluids, the valve comprising a valve member having a body that provides a separator seal.

In a ninth aspect the invention provides a combined valve and thermostat, the thermostat comprising a hollow body containing a thermally responsive material and a force transmitting member, the valve having a valve member arranged on an external surface of the hollow body and integral with the force transmitting member.

In a tenth aspect the invention provides a thermostatic mixer for mixing two fluids, the mixer having a thermostat according to any one or more of the first, second, third, fourth, fifth and sixth aspects.

In an eleventh aspect the invention provides a thermostatic mixer for mixing two fluids, the mixer having a valve according to the seventh and/or eighth aspects.

In a twelfth aspect the invention provides a thermostatic mixer for mixing two fluids, the mixer having a combined valve and thermostat according to the ninth aspect.

The invention claimed is:

1. A thermostat comprising a hollow body containing a thermally responsive material, and a force transmitting member affixed to the body by an over moulded portion, wherein the hollow body has a sidewall extending from a first end to a second end, and the over moulded portion is located within the hollow body.

2. The thermostat according to claim 1 wherein the force transmitting member is configured to control a force applied to the force transmitting member by the thermally responsive material.

3. The thermostat according to claim 2 wherein the force transmitting member has one or more recessed areas at an interface between the force transmitting member and the thermally responsive material, wherein the thermally responsive material is received in one or more recessed areas.

4. The thermostat according to claim 1 wherein the over-moulded portion is affixed to the body by a bonding agent, and wherein the bonding agent comprises at least one of an adhesive or a chemical bonding agent.

5. The thermostat according to claim 1 wherein the over-moulded portion is affixed to the sidewall between the first and second ends.

6. The thermostat according to claim 1 wherein the force transmitting member includes one or more additives to reduce friction with contact surfaces in contact with the force transmitting member.

7. The thermostat according to claim 1 wherein the force transmitting member is affixed to an actuator member by the over-moulded portion.

8. The thermostat according to claim 1 including an overload device.

9. The thermostat according to claim 8 wherein the overload device is configured to provide an increase in volume of a chamber containing the thermally responsive material under overload conditions, or wherein the overload device is configured to provide a recessed area for reception of the force transmitting member under overload conditions.

10. The thermostat according to claim 1 further comprising a bellows section configured to bias the thermally responsive material.

11. The thermostat according to claim 1 wherein the thermostat is configured to increase a surface area for heat transfer to the thermally responsive material, the thermostat body is provided with at least one flute for increasing the surface area of the body, and each flute extends in a direction of fluid flow past the thermostat.

12. The thermostat according to claim 1 wherein the thermostat is configured to smooth flow of fluid past the thermostat.

13. The thermostat according to claim 1 wherein the thermally responsive material is a wax.

14. The thermostat according to claim 1 wherein the thermostat body comprises a thermally conductive material.

15. The thermostat according to claim 1 further including a valve member, that is affixed to the thermostat body.

16. The thermostat according to claim 15 wherein the valve member is formed integrally with the force transmitting member.

17. The thermostat according to claim 15 wherein the valve member has an integral sealing portion.

18. The thermostat according to claim 15 wherein the valve member has one or more through holes for fluid flow from a first side of the valve member to a second side of the valve member.

19. A thermostatic valve having a thermostat according to claim 1.

20. The thermostatic valve according to claim 19 wherein the thermostat is responsive to a temperature of fluid flowing over an external surface of the thermostat body, a volume of the thermally responsive material changes in response to a change in the temperature of the fluid and the force transmitting member transmits the change in volume to an actuator member, the actuator member responds to the change in volume of the thermally responsive material to control flows of hot and cold water through the thermostatic valve, and the force transmitting member is integrated with a valve member to control flows of hot and cold water through the thermostatic valve.

* * * * *